(12) United States Patent
Miklos

(10) Patent No.: US 7,718,914 B2
(45) Date of Patent: May 18, 2010

(54) METAL-PROTECTIVE GAS-JOINT WITH CHANGEABLE POLARITY

(75) Inventor: Ernst Miklos, Tutzing (DE)

(73) Assignee: Linde Aktiengesellschaft, Wiesbaden (DE)

( * ) Notice: Subject to any disclaimer, the term of this patent is extended or adjusted under 35 U.S.C. 154(b) by 241 days.

(21) Appl. No.: 11/759,009

(22) Filed: Jun. 6, 2007

(65) Prior Publication Data

US 2007/0228027 A1 Oct. 4, 2007

Related U.S. Application Data

(62) Division of application No. 10/874,254, filed on Jun. 24, 2004, now Pat. No. 7,244,904.

(30) Foreign Application Priority Data

Jun. 26, 2003 (DE) ................ 103 28 968

(51) Int. Cl.
*B23K 9/173* (2006.01)
(52) U.S. Cl. ............ 219/74; 219/137 PS; 219/137 WM
(58) Field of Classification Search ............... 219/74, 219/137 PS, 137 WM
See application file for complete search history.

(56) References Cited

U.S. PATENT DOCUMENTS

| | | | |
|---|---|---|---|
| 2,908,800 A * | 10/1959 | Breymeier | ........... 219/74 |
| 3,309,490 A | 3/1967 | Cary | |
| 5,210,389 A | 5/1993 | Farwer | |
| 5,609,783 A | 3/1997 | Fawer | |
| 5,667,703 A | 9/1997 | Soula et al. | |
| 6,376,802 B1 | 4/2002 | Tong et al. | |
| 6,596,971 B1 | 7/2003 | Biskup et al. | |
| 7,071,438 B2 | 7/2006 | De Abreu Macedo et al. | |
| 7,244,904 B2 * | 7/2007 | Miklos | ........... 219/74 |
| 2001/0047988 A1 | 12/2001 | Hiraoka et al. | |
| 2002/0153363 A1 | 10/2002 | Hiraoka et al. | |

FOREIGN PATENT DOCUMENTS

| | | |
|---|---|---|
| DE | 19649887 | 2/1998 |
| EP | 0584000 | 2/1994 |
| EP | 0949038 | 10/1999 |
| EP | 1 103 329 | 5/2001 |
| EP | 1112804 | 7/2001 |
| EP | 1 186 368 | 3/2002 |
| EP | 1256410 | 11/2002 |
| EP | 1321217 | 6/2003 |
| GB | 762801 | 12/1956 |
| JP | 11 028594 | 1/2005 |

OTHER PUBLICATIONS

European Search Report dated Jan. 26, 2005.

* cited by examiner

*Primary Examiner*—Kevin P Kerns
(74) *Attorney, Agent, or Firm*—Crowell & Moring LLP

(57) ABSTRACT

A method of gas-shielded metal arc joining using a consumable electrode having an alternating polarity (GMA-AC). A shielding gas containing argon is used to improve process stability and working speed.

1 Claim, No Drawings

METAL-PROTECTIVE GAS-JOINT WITH CHANGEABLE POLARITY

RELATED APPLICATION INFORMATION

This application is a divisional of application Ser. No. 10/874/254, filed Jun. 24, 2004, now U.S. Pat. No. 7,244,904.

This application claims the priority of German Patent Application No. 103 28 968.2, filed Jun. 26, 2003, the disclosure of which is expressly incorporated by reference herein.

BACKGROUND OF THE INVENTION

The invention relates to a method of Gas-shielded Metal Arc joining with a consumable electrode having an alternating polarity (GMA-AC).

Gas-shielded metal arc joining comprises the joining of metals by welding, brazing or combinations of these methods using a shielding gas. For years, gas-shielded metal arc welding (GMA welding or GMAW) has been the predominantly used method of joining metallic materials and is defined and described in International Standards Organization Publication ISO 857. In GMA welding, filler material is fed in an arc which burns between a consumable electrode and one or more workpieces. In the process, a connection is created with the base material, which also undergoes melting. Depending on the type of shielding gas used, the process can be characterized as welding with an inert gas or welding with an active gas. The shielding gas selection depends on the materials to be welded.

For several years, GMA brazing has also been practiced as a variant of the GMA welding process. Here, a wire electrode is used which has a low melting point. The object of the process is to make a brazed joint with no melting of the base material, if possible, or with only slight melting of the base material. More recently, a combination of both processes has also been attempted, such as for joining aluminum materials to coated steel plates. In this case, the process more closely resembles a brazing process on one side of the material, while it more closely resembles a welding process on the other side. All of these processes are carried out using direct current (DC) or pulsed direct current. An example of this type of process is described in European Patent Document EP 1 129 808 A1. In most applications, the consumable electrode is positively polarized, and the base material is negatively polarized. This type of polarization ensures a sufficient pinching of the liquid-pasty molten metal of the electrode by way of the so-called "pinch force". In processes with pulsed current, this is a prerequisite for a regular and reproducible material transfer. On the base material side, the negative polarization causes an electron emission which contributes to the heating and melting of the metal, either with respect to the surface or by way of drifting points. In a few exceptional cases, a negatively polarized, consumable electrode is used. These are special applications, such as build-up welding or welding with certain filler wires.

For several years, it has also been attempted to let the filler material be consumed using a current that provides an alternating polarity; see European Patent Document 1 103 329 A2 or International Institute of Welding Document No. XII-1720-02 of May 2002.

The following are the advantages of this process: Better preheating of the wire electrode during the negatively polarized phase and, as a result, a higher capacity for consuming the wire electrode; better ability to bridge gaps for thin components; and the ability to use GMA welding for sheets that were too thin using previous techniques. Because of these advantages, the new process is receiving much attention particularly in the automobile industry. Currently, two different equipment types are already on the market; additional suppliers are expected soon. Research organizations and institutes expect a far-reaching potential for the GMA-AC process. The further developments of the following process/material combinations are of particular interest:

AC-GMA welding with an inert shielding gas of aluminum alloys,

AC-GMA welding of coated and uncoated steel,

AC-GMA welding with an active shielding gas of thin steel plates,

AC-GMA joining ("braze-welding") of aluminum with coated and uncoated steel plates, AC-GMA welding of heat-sensitive materials, AC-GMA build-up welding.

As a result of the use of the AC technique, an improved consuming capacity without increased heating of the base material is expected. Better gap bridgeability is also expected, as well as the possibility of using wire electrodes having a larger diameter, which are more stable when transported.

In the previous publications, only the gases known from conventional DC processes were used in the application of the AC technique. It does not appear that the influence of shielding gases in AC-GMA welding and brazing has been investigated.

It is known that joining using a relatively cold arc, and thus a low introduction of heat into the base material, also has disadvantages. The wetting behavior is poor, and the joining seam can have a convex profile. The very narrow seam may, in turn, have a negative effect on the gap bridgeability. In the case of dynamically stressed parts, a convex seam also results in a geometric notch with correspondingly negative effects on the service life of the component. In the case of materials which tend to form pores, such as aluminum alloys, the frequency of pores increases because the gases are frozen into the fast-cooling molten metal. If insufficient wetting/melting is achieved at the surface of the components, rejects are obtained as a result of the lack of fusion at various locations, such as in the root layer, in the side wall, or between two layers. Based on the objective of increasing the productivity in today's modern manufacturing, joining speeds are constantly increasing. However, increasing the welding travel speed or brazing travel speed leads to an intensification of the above-mentioned disadvantages. Thus, the main advantage of the AC process—the low introduction of heat into the base material—is a disadvantage with respect to possible speeds, particularly in the case of fully mechanical robot joining techniques.

SUMMARY OF THE INVENTION

It is an object of the invention to provide an improved GMA-AC process such that the process stability, the seam quality and the working speed are increased.

This and other objects and advantages are achieved by the method of gas metal arc joining according to the invention. In an embodiment, the method comprises gas-shielded metal arc joining using a consumable electrode having an alternating polarity and a shielding gas that contains helium.

In another embodiment, the shielding gas comprises 10-100% helium, preferably 14-55% helium, and more preferably 25-35% helium. The remainder of the shielding gas is preferably an inert gas, such as argon.

In still another embodiment, the shielding gas contains one or more dopant gases, such as $O_2$, $CO_2$, $N_2$, NO, or $N_2O$. The shielding gas can contain 0.001 to 0.1% of these doping constituents. Alternatively, the shielding gas can contain 0.1 to 5% of the dopant gases. In still another alternative, the shielding gas can contain 0.01 to 3% of the dopant gases. In yet another alternative, the shielding gas can contain 3 to 12% of the dopant gases, and preferably 5-10%.

In yet another embodiment, the shielding gas contains argon and at least one dopant gas without any helium. The shielding gas preferably contains from 0.001 to 0.1% of the dopant gases.

Another object of the invention is to provide a shielding gas for use in GMA-AC joining. In an embodiment, the shielding gas contains argon, helium and 0.001 to 0.1% of at least one dopant gas selected from the group consisting of $O_2$, $CO_2$, $N_2$, NO, or $N_2O$. In another embodiment, the shielding gas contains at least one of argon and helium, and from 0.1 to 12% of at least one of $O_2$ and $CO_2$.

DETAILED DESCRIPTION OF THE EMBODIMENTS

By targeted admixing of helium and/or active gases, the arc-physical processes can be influenced such that welding and/or brazing of metallic materials by means of the AC-GMA process can be significantly improved with respect to process stability, seam quality and possible speeds.

It has been found that helium fractions in the phase of the negatively polarized electrode cause drifting of the arc starting point along the wire electrode. The effect is particularly strong in the case of high helium fractions but is already clearly recognizable starting at 10% helium. The relatively high price of helium is a disadvantage for the use of high helium fractions. Mixtures of argon or another inert gas (noble gas) and helium are therefore preferred. It is also advantageous to use a shielding gas containing 14-55% helium or 25-35% helium, the remainder of the shielding gas being argon.

The light phenomena occurring at the cathode during a joining process are to be interpreted as light quantums emitted due to either 1) electrons emerging from the wire surface recombine with gas ions, metal ions or metal vapor ions, or 2) energetically excited particles on the wire surface changing into a lower excitation level. These phenomena account for the preheating effect of the negative polarization during AC joining. It is also believed that, with the drifting of the arc high along the wire end, the preheating effect also increases. This means that, when helium is admixed to the shielding gas, the melting capacity of the wire can also be increased because the preheated wire is hotter and can be consumed more easily. A possible explanation as to why this drifting occurs, can be based on the different ionization energy of argon (15.8 eV/molecule) in comparison to helium (24.6 eV/molecule). The higher ionization energy of helium results in a drop of the number of charge carriers in the arc space. However, since the current sources endeavor to keep either the arc length, the arc voltage or the arc current constant, a forced additional electron emission occurs from the negatively polarized wire. Also, just as the energy expenditures for ionizing helium are greater, more energy is also released during recombination of an electron with a helium ion.

In a preferred embodiment, the shielding gas contains one or more of the gases $O_2$, $CO_2$, $N_2$, NO or $N_2O$ as additional constituents or doping gases, preferably in the range of from 0.001 to 0.1%.

In another preferred embodiment, these doping gases can be added in a concentration of from 0.1 to 5%, resulting in a highly doped shielding gas.

Additional variants of the invention suggest a medium doping where between 0.01 and 3% of the above-mentioned doping gases can be used, or a very high doping (5-12%) of the above-mentioned constituents in the shielding gas.

Advantages according to the invention are also achieved in an embodiment where the shielding gas contains no helium. Instead, the shielding gas contains argon and at least one of the gases $O_2$, $CO_2$, $N_2$, NO or $N_2O$, preferably 0.001 to 0.1%.

In an embodiment, the invention comprises joining with a shielding gas of argon, helium and 0.001 to 0.1% $O_2$, $CO_2$, $N_2$, NO or $N_2O$.

It has also been found that admixtures of active gas constituents, such as $O_2$, $CO_2$, $N_2$, $N_2O$, NO, either alone or in combination, show an effect opposite to that of helium. Thus, an active constituent, such as $O_2$, suppresses the drifting of the arc starting points along the wire electrode. The observed light phenomena are concentrated on the liquid drop formed at the end of the electrode, but they are more intense here. The effect could already be observed at 0.03% $O_2$, or 0.05% $CO_2$, or 0.0275% NO, or 0.02% $N_2$ in argon or Ar/He mixtures. One explanation could be the differences of the required energies which are necessary for the ejection of electrons from a surface. In the case of aluminum, this energy is 3.95 eV; in the case of aluminum oxide, it is only 1.77 eV. The oxygen offered in the shielding gas reacts immediately with the hot wire end and forms aluminum oxide. The largest oxide quantity is formed where the temperatures are the highest. Since the electrons can exit out of the aluminum oxide much more easily than out of the "pure" aluminum surface, which is also colder, the arc starting point will remain where the current can flow with the least resistance, specifically at the wire end. This effect leads to a lower heating of the free wire end and to overheating of the liquid aluminum drop. In all tests with active constituents, high-speed photography indicates a hotter, more liquid drop. In an extreme case, an explosion of the drop will take place. Since the difference between the electron work function of the metal and of the corresponding metal oxide also exists for other metallic materials and alloys, this theory also applies to these materials.

By understanding the operating mechanisms of the shielding gas constituents, the AC-GMA process can now be additionally influenced. Using a helium constituent, the active cathode surface can be forced to spread out, while active constituents, such as $O_2$, $CO_2$, $N_2$, $N_2O$, NO, etc. cause a focusing of this surface on the free wire end. As a result, additional influencing variables are thereby made available in practice, by means of which an application-related optimizing can take place.

When helium-containing gases were used, for example, in comparative tests on aluminum, a higher welding travel speed could always be achieved than using argon alone. The seam surface, the wetting and the pore image were better using the helium-containing gases (argon-helium mixture, offered by LINDE AG under the name of VARIGON He). The advantages of the low active gas constituents were evident particularly when the work took place at low electric power values. In the lower power range, the arc of this process tends to exhibit fluctuation or instability. The latter can be suppressed by the above-mentioned constituents, which has a positive effect on the seam surface, the spray reduction or the frequency of pores, etc. An important advantage of the helium in all GMA-AC processes is the additional heating effect which, however, only has a surface effect. Thus, despite the characteristic and undesired low introduction of heat of the AC process into the base material, a good heating can be achieved at the seam surface. This causes the good wetting at the seam junction and a good degasifying of the molten material. In the phase of the positively polarized consumable electrode, helium has an arc-spreading effect which improves gap bridgeability and reduces "falling-through" in the case of a wider gap.

Tests have illustrated that gases containing pure helium or a mixture of argon and helium are particularly suitable for aluminum. Tests were also positive using gas mixtures of argon, helium and the doping gases mentioned above, or gas mixtures containing argon without helium but with doping.

Gas mixtures composed of pure helium, or that contain helium, optionally argon, and 0.01 to 12% of a doping gas selected from the group consisting of $O_2$, $CO_2$, $N_2$, NO, and $N_2O$ are particularly preferred for the welding of steel. Preferred doping gas amounts include from 0.1 to 5%, 0.01 to 3%, 3 to 12%, and 5 to 10%. A gas mixture containing argon, 10 to 90% helium, and doping with 0.001 to 0.1% $O_2$ or $CO_2$ is preferable for the GMA welding of steel.

For the welding of titanium and titanium alloys, magnesium alloys, nickel master alloys, preferred gas mixtures include mixtures containing from 10-100% helium with the remainder argon or another inert gas; helium, 0.001 to 0.1% of $O_2$, $CO_2$, $N_2$, NO, or $N_2O$, and optionally argon or another inert gas; and helium, 0.01 to 3% of $O_2$, $CO_2$, $N_2$, NO, or $N_2O$, and optionally argon or another inert gas are preferred.

Gas mixtures suitable for build-up welding include pure helium; 10-100% helium with the remainder argon or another inert gas; helium, 0.001 to 0.1% of $O_2$, $CO_2$, $N_2$, NO, or $N_2O$, and optionally argon or another inert gas; and helium, 0.1 to 5% of $O_2$, $CO_2$, $N_2$, NO, or $N_2O$, and optionally argon or another inert gas.

For the joining of different materials (braze-welding or weld-brazing), gases having low dopings in argon and helium are particularly preferred, such as pure helium; at least 10% helium with the remainder argon or another inert gas; or helium, 0.001 to 0.1% of $O_2$, $CO_2$, $N_2$, NO, or $N_2O$, and optionally argon or another inert gas.

For the GMA-AC brazing of materials of the same type or of different materials, coated and/or uncoated, preferred gases include pure helium; at least 10% helium with the remainder argon or another inert gas; helium, 0.001 to 0.1% of $O_2$, $CO_2$, $N_2$, NO, and $N_2O$, and optionally argon or another inert gas; helium, 0.01 to 3% of $O_2$, $CO_2$, $N_2$, NO, and $N_2O$, and optionally argon or another inert gas; argon and at least one of $O_2$, $CO_2$, $N_2$, NO, and $N_2O$, with no helium; argon, helium, and 0.001 to 0.1% of $O_2$, $CO_2$, $N_2$, $NO_2$, or $N_2O$; and at least one of argon and helium with 0.1 to 12% of at least one of $O_2$ and $CO_2$.

Although the present invention has been illustrated and described with respect to exemplary embodiment thereof, it should be understood by those skilled in the art that the foregoing and various other changes, omission and additions may be made therein and thereto, without departing from the spirit and scope of the present invention. Therefore, the present invention should not be understood as limited to the specific embodiment set out above but to include all possible embodiments which can be embodied within a scope encompassed and equivalent thereof with respect to the feature set out in the appended claims.

What is claimed is:

1. A method of gas-shielded metal arc joining, comprising: joining one of ferrous and non-ferrous metals by gas-shielded metal arc joining using a consumable electrode having a pulsed alternating polarity current and a shielding gas comprising argon, no helium, and 0.001% to 0.1% of dopant gas, said dopant gas including at least one of $O_2$, $CO_2$, $N_2$, NO and $N_2O$.

* * * * *